(12) United States Patent
Ueda

(10) Patent No.: US 6,531,311 B2
(45) Date of Patent: Mar. 11, 2003

(54) METHOD FOR CONTINUOUSLY PROCEEDING ORGANIC MATERIAL AND AN APPARATUS FOR CONDUCTING THE SAME METHOD

(76) Inventor: Yasuichi Ueda, 880-1 Aza Ohama, Motobu-cho, Kunigami-gun, Okinawa 905-0212 (JP)

( * ) Notice: Subject to any disclaimer, the term of this patent is extended or adjusted under 35 U.S.C. 154(b) by 0 days.

(21) Appl. No.: 09/912,719

(22) Filed: Jul. 26, 2001

(65) Prior Publication Data

US 2002/0058333 A1 May 16, 2002

Related U.S. Application Data

(63) Continuation-in-part of application No. 09/311,660, filed on May 12, 1999, now Pat. No. 6,284,527.

(51) Int. Cl.[7] .......................... C05F 11/08; C12M 1/00
(52) U.S. Cl. ................... 435/290.4; 435/286.7; 71/9; 71/11
(58) Field of Search .................. 435/286.7, 290.4; 71/8, 9, 11

(56) References Cited

U.S. PATENT DOCUMENTS

| | | | | |
|---|---|---|---|---|
| 3,245,759 A | * | 4/1966 | Eweson | 34/137 |
| 5,028,398 A | * | 7/1991 | Hallberg et al. | 422/188 |
| 5,047,349 A | * | 9/1991 | Eweson | 422/209 |
| 5,407,809 A | * | 4/1995 | Finn | 34/137 |
| 5,559,033 A | * | 9/1996 | Young | 435/290.3 |
| 6,001,641 A | * | 12/1999 | Posselius et al. | 435/286.1 |
| 6,071,740 A | * | 6/2000 | Kerouac | 435/290.3 |
| 6,284,527 B1 | * | 9/2001 | Ueda | 435/290.2 |

* cited by examiner

Primary Examiner—David A. Redding

(57) ABSTRACT

A method for continuously processing organic material, which comprises the steps of:

- jointly disposing at least three fermenting tanks in series with each having at least one stirring apparatus and at least one temperature detector (Step 1);
- supplying a predetermined amount of processing material into the first fermenting tank (Step 2);
- detecting temperature in each of the fermenting tanks and controlling amount of half fermented material to be transferred from a fermenting tank positioned at upper stream to a fermenting tank positioned at lower stream such that the temperature in each of the fermenting tanks maintains at temperature of "the final phase of fermentation heat rising period" or "constant temperature period" (Step 3); and
- discharging composted organic material from the last fermenting tank properly when the processing material has been composted (Step 4). Therefore, fermentation progress of each of the fermenting tanks proceeds evenly, and the organic material is composted in short time using fermenting microorganism activation efficiently.

5 Claims, 12 Drawing Sheets

Fig. 7  Change of Temperature in Fermenting Tank and Time needed for Composting

Fig. 9 Change of Temperature When Raw Food Waste Was Added in "Fermentation Temperature Rising Period" in Fermenting Tank
(Relation between weight and temperature in fermenting tank)

Fig. 10 Change of Temperature When Raw Food Waste Was Added in "Fermentation Temperature Rising Period" in Fermenting Tank
(Relation between weight and temperature in fermenting tank)

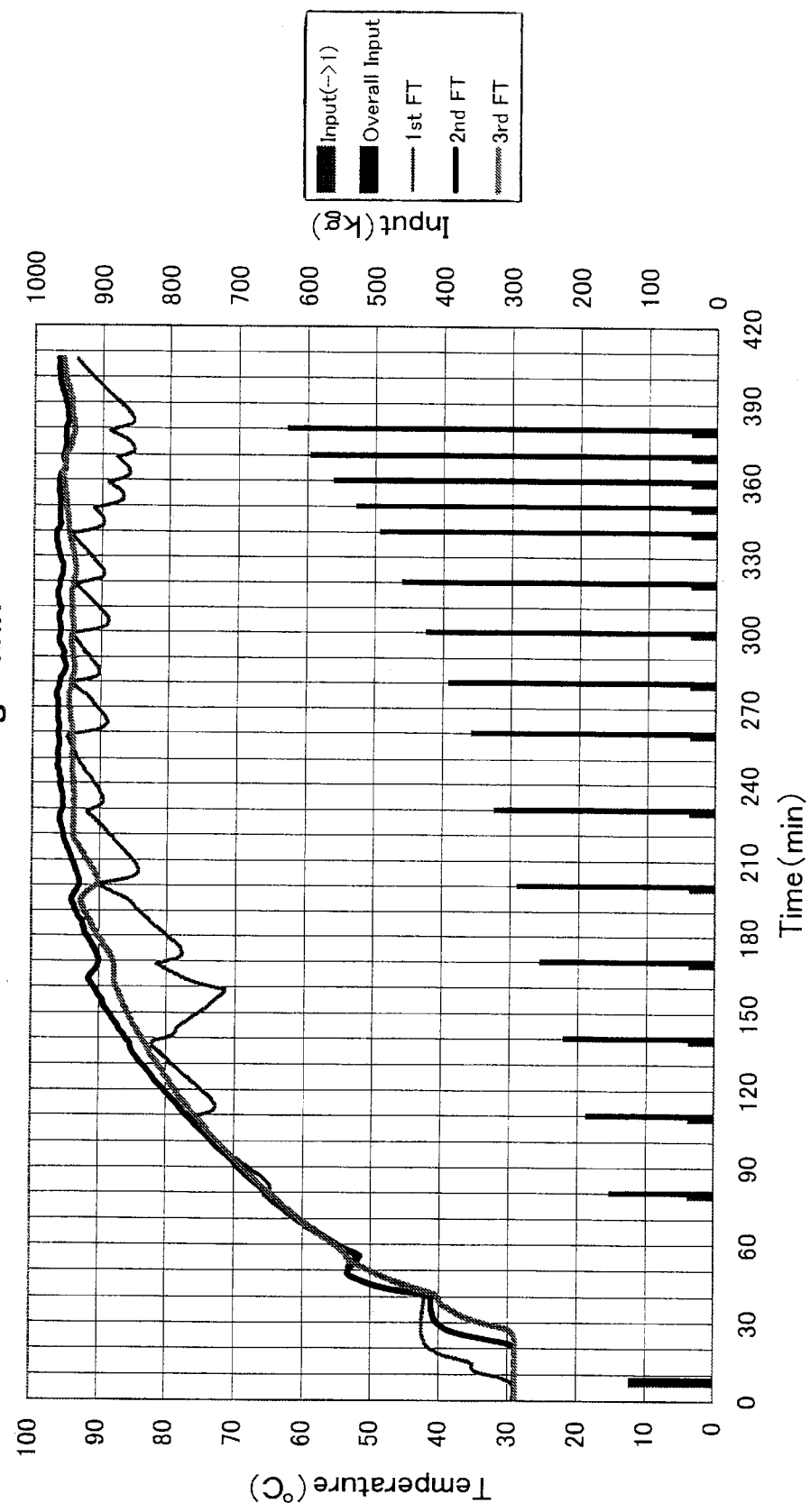
Fig. 12  30min,20min,10min Intervals : Input & Temperature inside the Fermenting Tank

METHOD FOR CONTINUOUSLY PROCEEDING ORGANIC MATERIAL AND AN APPARATUS FOR CONDUCTING THE SAME METHOD

This U.S. patent application is filed as a copending continuation-in-part (CIP) of U.S. patent application Ser. No. 09/311,660, filed on May 12, 1999 by the same inventor, now issued as U.S. Pat. No. 6,284,527.

BACKGROUND OF THE INVENTION

The present invention is related to a method for continuously processing organic material which ferments and composts effectively and continuously organic matter such as left over food or raw food waste and an apparatus for conducting the same method.

Conventionally, a variety of food waste processing apparatus which compost raw food waste are known; thus, a small size apparatus for home use which is open at the bottom part and buried in the grounds, to which fermenting germ is added to ferment raw food waste by the germ, a middle size apparatus which has crushing/stirring apparatus inside thereof, or a large size apparatus for industrial use which has independent crushing apparatus, stirring apparatus and fermenting tank. However, the small size apparatus of the prior raw food waste processing apparatus has only a small proceeding ability and can fail to ferment caused by lack of temperature, and has a shortcoming of resulting in decomposition and infesting maggots. The middle size one has necessity for the capacity of the fermenting tank to become five to ten times bigger than its proceeding ability of raw food waste which yields everyday. It also has a shortcoming of insufficient fermentation caused by additionally supplying raw food waste into the fermenting tank. Such supplying is usually conducted without taking account of microorganism's activation inside of the fermenting tank. Further, the large size one has a shortcoming of necessity of man management which results in high facility and maintenance costs.

Accordingly, for example, business facilities yielding a huge amount of raw food waste such as meal supplying center and restaurants have a problem of too much burden for self-processing by establishing such large size raw food waste processing apparatus. So, these business facilities generally rely on specialized processing traders or collection of hog raisers who use the waste to feed pigs.

But recently less leftover food is used to feed pigs, and hog raisers themselves are decreased in large numbers. With the decrease of these collecting traders, it has been more and more difficult to proceed raw food waste fast, and moreover new problems related to proceeding raw food waste have emerged.

For example, when raw food waste is incinerated, many problems occur. For example, a problem of dregs after the incineration, an offensive odor at incinerator and its surrounding areas, a problem of environment contamination such as flies and smoke, and a social problem promoting production of dioxin, a poisonous substance because raw food waste prevents temperature from rising in incinerator.

The aim of the present invention is to solve these problems of the prior raw food waste processing apparatus. Further, it is to provide a method for continuously processing organic material and an apparatus for conducting the same method in which steps from crushing organic material such as raw food waste to composting are automated and continuously proceeded in the best fermentation conditions without interruption. With the invention, more processing ability than capacity of fermenting tank can be obtained, facility and running costs dramatically decreases, and it is capable of being adopted from small size to large size ones.

DESCRIPTION OF THE INVENTION

The present invention solving said problems provides a method for continuously processing organic material, which comprises the steps of:

jointly disposing at least three fermenting tanks in series with each having at least one stirring apparatus and at least one temperature detector;

supplying a predetermined amount of proceeding material into the first fermenting tank, said processing material being made by stirring and crushing fermentation promoting agent in which microorganism is implanted in advance within organic material such as raw food waste;

detecting temperature in each of the fermenting tanks and controlling amount of the half fermented material to be transferred from the fermenting tank positioned at upper stream to the fermenting tank positioned at lower stream such that the temperature in each of said fermenting tanks maintains at temperature of "final phase of fermentation heat rising period" or "constant temperature period"; and discharging composted organic material from the last fermenting tank properly when the processing material has been composted.

At least three fermenting tanks are disposed in series so fermentation progress of each of the fermenting tanks proceeds evenly while amount of the half fermented material to be transferred from the fermenting tank positioned at upper stream to the fermenting tank positioned at lower stream is adjusted or controlled to maintain temperature of each of the fermenting tanks at temperature of "final phase of fermentation heat rising period" or "constant temperature period", the organic material is composted in short time by using fermenting microorganism activation efficiently. Accordingly, the organic material is continuously fermented.

The invention described in claim 2 resides in a method for continuously processing organic material as stated in claim 1, the method further including fermentation preparing step prior to said step of supplying a predetermined amount of processing material into the first fermenting tank, said fermentation preparing step including supplying a predetermined amount of the processing material into each of the fermenting tanks and fermenting it so that temperature in each of the fermenting tanks reaches at temperature of "final phase of fermentation heat rising period" or "constant temperature period".

When preparing to start the method of the present invention, a certain amount of the processing material made of the stirred and crushed fermentation promoting agent and organic material is supplied into each of the fermenting tanks and, by fermenting it, the temperature in each of the fermenting tanks reaches at temperature of "final phase of fermentation heat rising period" or "constant temperature period". Except the start-up time, this fermentation preparing step in each of the fermenting tanks is not necessary because the processing material which has fermented to a certain level of fermentation is supplied to the fermenting tank successively, and accordingly, the time needed for fermentation process becomes short.

The invention described in claim 3 resides in a method for continuously processing organic material as stated in claim 1 or 2, wherein said step of supplying a predetermined amount of the processing material comprises a step of randomly dumping the organic material which yields everyday as household raw waste into a high capacity tank in which the fermentation promoting agent has been provided, stirring and crushing it, and the supplying step is conducted under the condition where the processing material is half fermented to reach at the temperature of "final phase of fermentation heat rising period" or "constant temperature period".

The high capacity tank, which is separately disposed from the fermenting tanks, is provided to be randomly supplied with the organic material yielding everyday to stir and crush it, so the organic material is fermented or half fermented to a certain level. Composting step takes place after the processing material is supplied in the fermenting tank where temperature management is carried out, so failure in the fermentation does not occur.

The invention described in claim 4 resides in a method for continuously processing organic material as stated in claim 3, wherein the high capacity tank includes a storage tank body in which the organic material yielding everyday is dumped and an organic material dumping apparatus which the organic material is dumped into the storage tank body while it drains water, and inside of the storage tank body are provided a stirring pipe with which crushing holes are formed and a stirring screw located in the stirring pipe which sends up the accumulated organic material on the bottom of the storage tank body and scatters some through the crushing holes of the stirring pipe and other through the upper end of the stirring pipe into the storage tank body again.

The organic material supplying apparatus first removes water to a certain level from the organic material to be proceeded, and the drained organic material is supplied into the storage tank body. In the storage tank body the fermenting microorganism is self-reproducing successively and it is stirred and crushed with the supplied organic material. The stirring screw is rotated in the stirring pipe, and sends up the accumulated organic material on the bottom of the storage tank body into the stirring pipe. The stirring screw pushes out some through the crushing holes of the stirring pipe with a certain amount of pressure and other through the upper end of the stirring pipe to scatter into the storage tank body again. By repeating or continuing this step, the processing material is mixed and crushed thoroughly and in the meantime, half fermented as time passed.

The second aspect of the present invention is an apparatus for continuously processing organic material, the apparatus comprises:
- at least three fermenting tanks disposed in series to each other, each of the fermenting tanks having at least one stirring apparatus and at least one temperature detector;
- a tank for stirring and crushing fermentation promoting agent in which fermenting microorganism is implanted and organic material such as raw food waste, and thereafter supplying a predetermined amount of the processing material of the half fermented material, temperature of which being at "final phase of fermentation heat rising period" or "constant temperature period", into the first fermenting tank;
- transferring conveyer which transfers the half fermented material from the fermenting tank positioned at upper stream to the fermenting tank positioned at lower stream and can adjust amount of the processing material to be transferred;
- a controller which detects temperature in each of the fermenting tanks and adjust amount of the half fermented material to be transferred from the fermenting tank positioned at upper stream to the fermenting tank positioned at lower stream such that the temperature in each of the fermenting tanks maintains at temperature of "final phase of fermentation heat rising period" or "constant temperature period; and
- a discharging apparatus which discharges the composted organic material from the last fermenting tank properly when the processing material has been composted.

BRIEF EXPLANATION OF THE DRAWINGS

These and other objects and advantages of the present invention will no doubt become obvious to those of ordinary skilled in the art after having read the following detailed description of the preferred embodiments as illustrated in the various drawing figures.

FIG. 12 is a graph showing relation between supplied amount and temperature in fermenting tank when the organic material is added in every 30 minutes.

DESCRIPTION OF THE PREFERRED EMBODIMENTS

Figure 1:
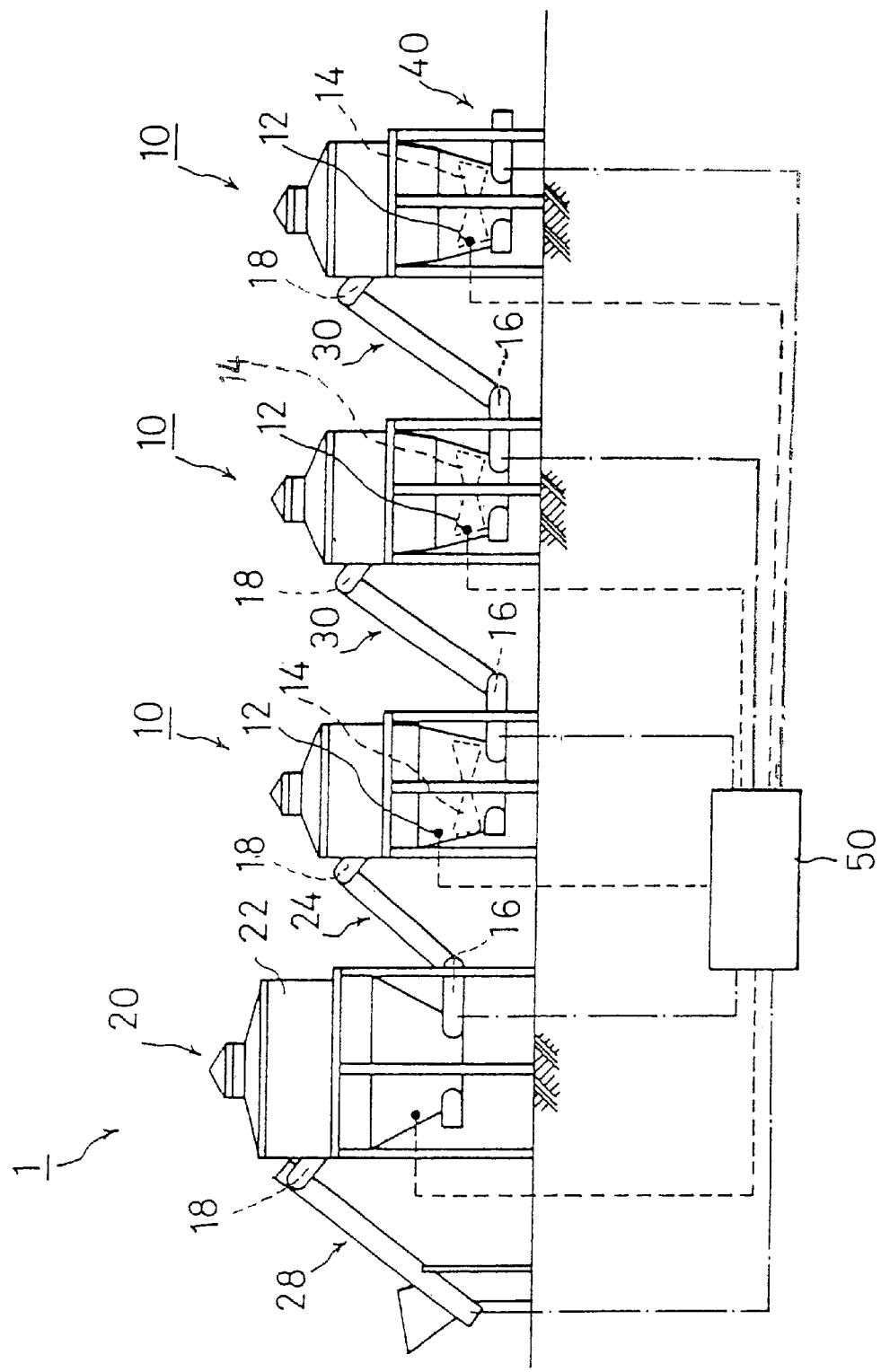
FIG. 1 is a schematic view of an embodiment of an apparatus for continuously processing organic material in accordance with the present invention.

FIG. 1 is a schematic view showing a preferred embodiment of an apparatus for continuously processing organic material in accordance with the present invention.

The apparatus 1 for continuously processing organic material according to the present invention is schematically comprised of at least three fermenting tanks 10 disposed in series to each other, supplying apparatus 20 which supplies a certain amount of the half fermented processing material into the first fermenting tank 10, transferring screw conveyer 30 which transfers the half fermented proceeding material from the fermenting tank 10 positioned at upper stream to the fermenting tank 10 positioned at lower stream, controlling apparatus 50 which detects temperature in each of the fermenting tanks 10, and at the same time, controls or adjusts amount of the processing material to be transferred, and discharging apparatus 40 which discharges the composted organic material from the last fermenting tank 10 properly.

Figure 2A:
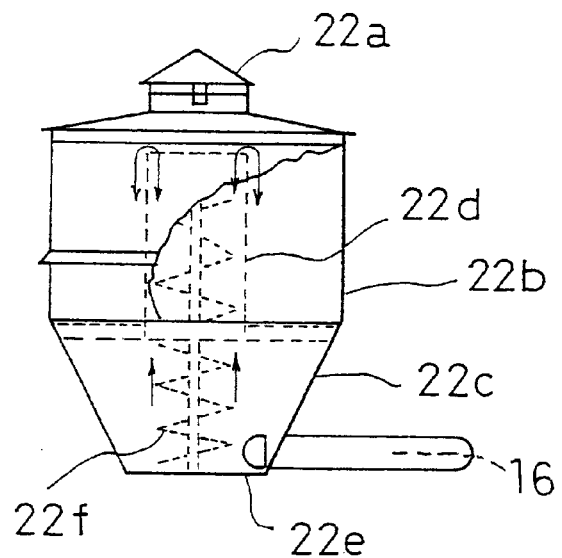
FIG. 2A is a partial cross sectional front view of the supplying apparatus shown in FIG. 1

In the drawings, the supplying apparatus 20 is used as a raw food waste processing apparatus as shown in FIG. 2A in details. But, any apparatus may be used if it can stir and crush the fermentation promoting agent and the organic material such as raw food waste, and supply a certain amount of the half fermented processing material into the first fermenting tank. Within this fermentation promoting agent, fermenting microorganism has been implanted. The supplying apparatus 20 has a high capacity storage tank body 22 and an organic material dumping apparatus 28. The high capacity storage tank body 22 has more capacity than the organic material yielding everyday and supplied in properly. The organic material dumping apparatus 28 drains and supplies the organic material into the storage tank body 22. The storage tank body 22 is comprised of a cylindrical water evaporating part 22b having an exhaust pipe 22a at the top, an connecting slot 18 on the side, and under it, an accumulating part 22c, equipped with connecting vent 16 at the bottom side, which tapers off and is closed at the bottom by a bottom wall 22e. Inside the storage tank body 22 a stirring pipe 22d formed with many crushing holes 22g is located. A stirring screw 22f is rotatably located in the stirring pipe 22d.

Figure 2B:
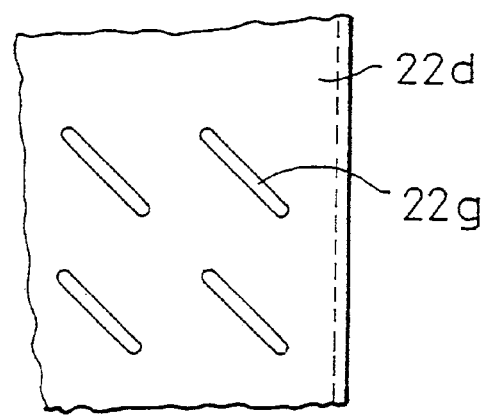
FIG. 2B is a partial enlarged front view of a stirring pipe located therein.

The crushing holes 22g is inclined to horizontal direction of 45 degrees as shown in details in FIG. 2B, and the processing material sent up in the stirring pipe 22d by the stirring screw 22f is pushed out from the crushing holes 22g with a certain pressure and crushed. The stirring screw 22f has the same upper end height as that of the stirring pipe 22d, and lower end having the screw wing which goes through lower opening part of the stirring pipe 22d and extends near the bottom wall 22e of the storage tank body 22. Accordingly, the organic material accumulated in the lower part of the storage tank body 22 is raised to scatter some though the crushing holes 22g of the stirring pipe 22d and the other through the upper end of the stirring pipe 22d into the storage tank body 22 again.

Figure 3:
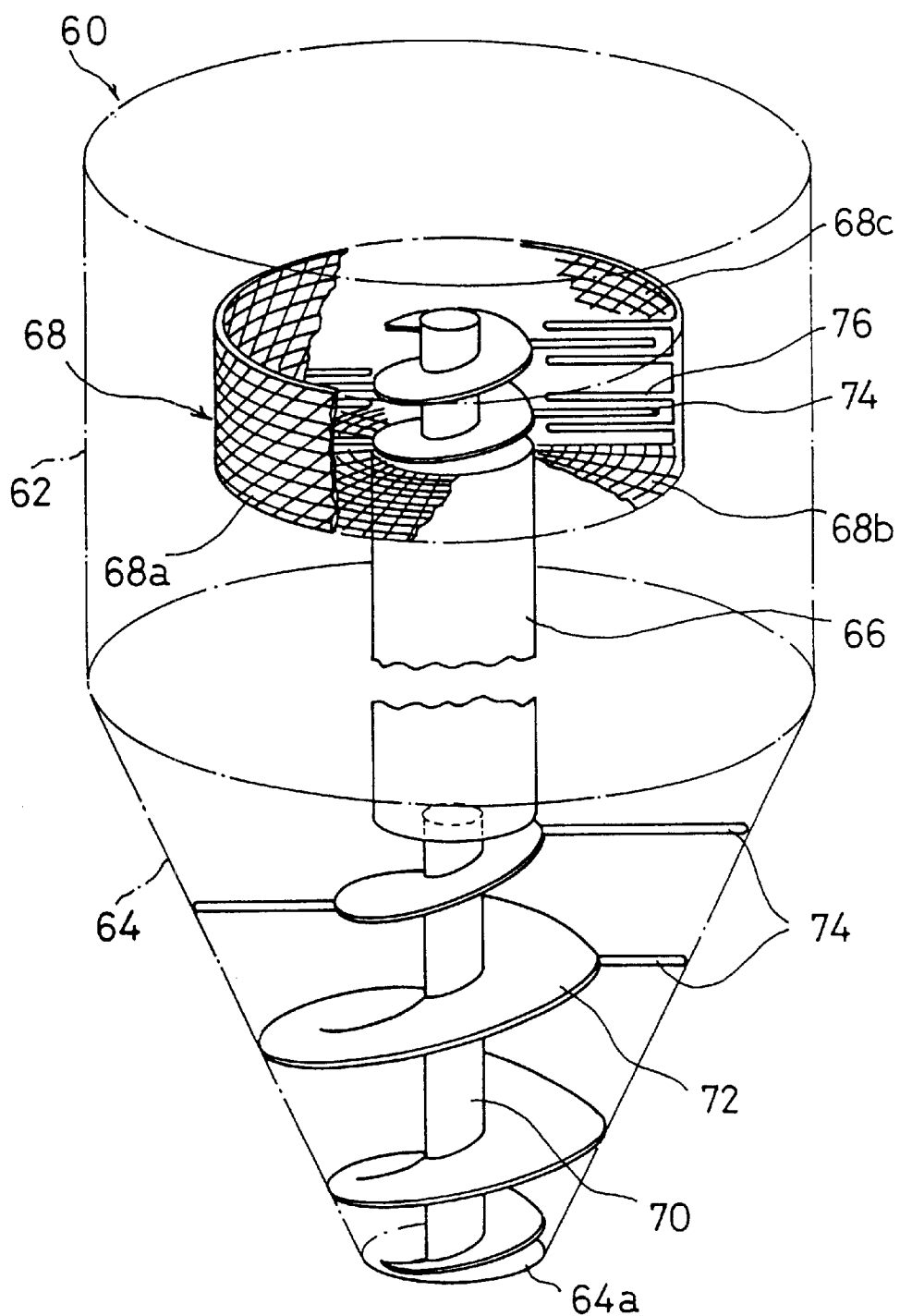
FIG. 3 is a schematic diagonal view of another embodiment of supplying apparatus as shown in FIG. 1.

In FIG. 3, another embodiment of the supplying apparatus is shown. In this embodiment, a storage tank body 60 is comprised of an upper cylindrical part 62 and a lower cut-end conic part 64 which tapers off and is closed at the bottom by a bottom wall 64a, and has same structure as the storage tank body 22 of the supplying apparatus 20. Inside of the storage tank body 60, an inner pipe 66 having a small diameter is located. The inner pipe 66 goes up from a certain point above the center of the bottom wall 64a. The inner pipe 66 does not have any holes or other openings. A mesh cylinder 68 having a large diameter is located jointly at the upper end of the inner pipe 66. The mesh cylinder 68 has a cylindrical side surface 68c, a circular bottom surface 68b and a circular top surface 68c, all of them being made of mesh members.

Further, a rotation axis 70 which goes through from the bottom wall 64a to the upper end of the mesh cylinder 68 has a spiral wing 72 capable of raising the accumulated organic material at the cut-end conic part 64 to the mesh cylinder 68. Width of the spiral wing 72 extends to come in contact with the inner surface at the lower half of the cut-end conic part 64, and at the remaining part it extends to come in contact with the inner surface of the inner pipe 66. Cutter members 74 are fixed at the proper points of the rim of the spiral wing 72, and cutter die members 76 are fixed to inside of the mesh cylinder 68 and positioned next to the cutter members 74. By cutting function between the cutter members 74 and the cutter die members 76 and by crushing function when going through the mesh cylinder 68, the proceeding material is stirred and crushed very well.

The organic material dumping apparatus 28 is comprised of a hopper 28a which has a vibration feeder at its lower end and a screw conveyer 28b which carries the raw food waste supplied in the hopper 28a to a connecting slot located at a certain point of the storage tank body 22. Water included in the raw food waste is separated from the waste at the hopper 28a and the screw conveyer 28b. Water then is sent to a drainage proceeding facility. On the other hand, a certain amount of water, for example, 30 weight/% of water included in solid waste is sent to the storage tank body 22.

The half fermented processing material is supplied to the first fermenting tank 10 by opening the connecting vent 16 of the supplying apparatus 20 and the connecting slot 18 of the fermenting tank 10 and delivering by the supplying conveyer 24 when the proceeding material reaches the temperature of "final phase of fermentation heat rising period" or "constant temperature period". This half fermented processing material is obtained by stirring the organic material and the fermentation promoting agent which has already implanted fermenting microorganism and by crushing it within the storage tank body 22.

The fermenting tank 10 is enough to have at least one stirring apparatus 14 and one temperature sensor 12 because the proceeding material has been crushed thoroughly in the fermenting apparatus 20. But, of course, the fermenting tank 10 may have a crushing structure to crush the proceeding material more thoroughly. Output of the temperature sensor 12 is transmitted to the controlling apparatus 50, so it controls or adjusts amount of the half fermented material to be transferred from the fermenting tank positioned at upper stream to the fermenting tank positioned at lower stream by a screw conveyer 30. During this period, temperature in each of the fermenting tanks 10 maintains at temperature of "final phase of fermentation heat rising period" or "constant temperature period". The fermenting tank 10 has the connecting slot 18 on the top side and connecting vent 16 on the bottom side. The stirring apparatus 14 has a motor driven spiral wing at the bottom of the fermenting tank 10.

Discharging apparatus 40 discharges the composted organic material accumulated on the bottom of the last fermenting tank 10 property.

Figure 4:
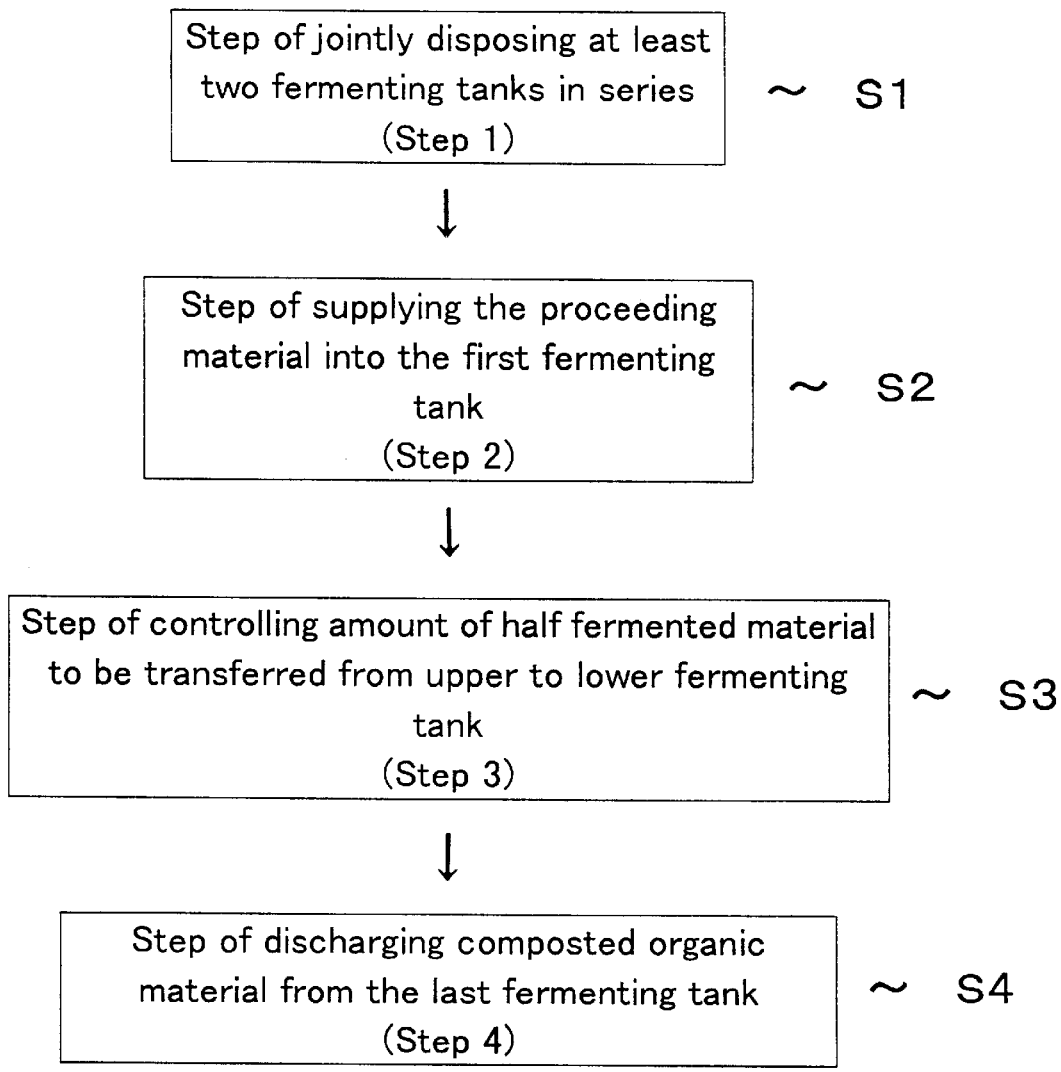
FIG. 4 is a flow chart showing a method for continuously processing organic material in accordance with the present invention.

Next, a method for continuously proceeding organic material in accordance with the present invention is explained with using FIG. 4.

The method for continuously processing organic material according to the present invention schematically comprises steps of jointly disposing fermenting tanks in series (Step S1), supplying a certain amount of processing material to the first fermenting tank 10 (Step S2), adjusting or controlling amount of the proceeding material to be transferred from the fermenting tank 10 positioned upper stream to the fermenting tank 10 positioned lower stream (Step S3), and discharging the compost from the last fermenting tank 10 (Step S4).

As Step S1, at least three fermenting tanks 10 each having a stirring apparatus 14 and temperature detecting sensors 12 are disposed jointly in series. Since at least three fermenting tanks 10 are disposed in series, fermentation progress of each of the fermenting tanks 10 can proceed evenly and, in the meantime, continuous fermentation becomes possible by sending the organic material from upper to lower successively with taking progress of the fermentation into consideration.

As Step S2, a certain amount of the processing material which is made by stirring and crushing the fermentation promoting agent, in which fermenting microorganism has been implanted, and the organic material such as raw food waste is supplied to the first fermenting tank 10. Stirring and crushing the fermentation promoting agent and the organic material can be proceeded in a high capacity tank 20 including the fermentation promoting agent. In the tank 20, the organic material yielding everyday is supplied or dumped randomly and stirred and crushed, and the material is fully fermented or half fermented to a certain level. Composting is proceeded in the fermenting tank 10 under temperature management or control, so fermentation failure does not occur. When the organic material yielding everyday is dumped into the high capacity tank 20, the organic material can be drained to a level that it has preferred water content rate suitable for the fermentation. Accordingly, it is possible to make suitable condition for the fermentation in the tank 20.

To promote stirring and crushing, inside the high capacity tank 20, the stirring pipe 22d with the crushing holes 22g and the stirring screw 22f which is located in the stirring pipe 22d may be disposed. The stirring screw 22f sends up the accumulated organic material on the bottom of the storage tank body 22 and scatters some through the crushing holes 22g of the stirring pipe 22d and other through the upper end of the stirring pipe 22d into the storage tank body 22 again. By rotating the stirring screw 22f in the stirring pipe 22d, the organic material accumulated on the bottom of the storage tank body 22 is raised. Some of the organic material are pushed out from the crushing holes 22g of the stirring pipe 22d with using a certain amount of pressure and the other is scattered through the upper end of the stirring pipe 22d into the storage tank body 22 again. By repeating or continuing this step, the processing material is mixed and crushed thoroughly and meanwhile is half fermented as time passed.

Further, fermentation preparing step may be added before Step S2. It is a step of supplying a certain amount, for example, 80% of the capacity of the fermenting tank 10 of the proceeding material into each of the fermenting tanks 10 and fermenting it, respectively. Through this step, temperature in each of the fermenting tanks 10 reaches at temperature of "final phase of fermentation heat rising period" or "constant temperature period". This processing material is made by stirring and crushing the fermentation promoting agent and the organic material.

When starting the method of the present invention, a certain amount of the processing material made of the stirred and crushed fermentation promoting agent and the organic material is supplied or dumped into each of the fermenting tanks 10. By fermenting it in each of the fermenting tanks 10, the temperature in each of the fermenting tanks 10 reaches at temperature of "final phase of fermentation heat rising period" or "constant temperature period". Except the start-up time, the fermentation preparing process in each of the fermenting tanks 10 is not necessary because the processing material fermented to a certain fermentation level is supplied thereto successively. Accordingly, the time needed for the fermentation process becomes short.

As Step S3, temperature in each of the fermenting tanks 10 is detected. At the same time, amount of the half fermented material from the fermenting tank 10 positioned at upper stream to the fermenting tank 10 positioned at lower stream is controlled or adjusted to maintain at temperature of "final phase of fermentation heat rising period" or "constant temperature period" in the fermenting tank. By maintaining at temperature of "final phase of fermentation heat rising period" or "constant temperature period" in the fermenting tank 10, activation of the fermenting microorganism is highly maintained and the organic material is composted efficiently and in short time.

As Step S4, the composted organic material is discharged properly with using, for example, a discharging apparatus 40 from the last fermenting tank 10. The discharging step may be conducted by discharging a certain amount of the compost at each pre-determined period or discharging a small amount of the compost continuously.

Figure 5:
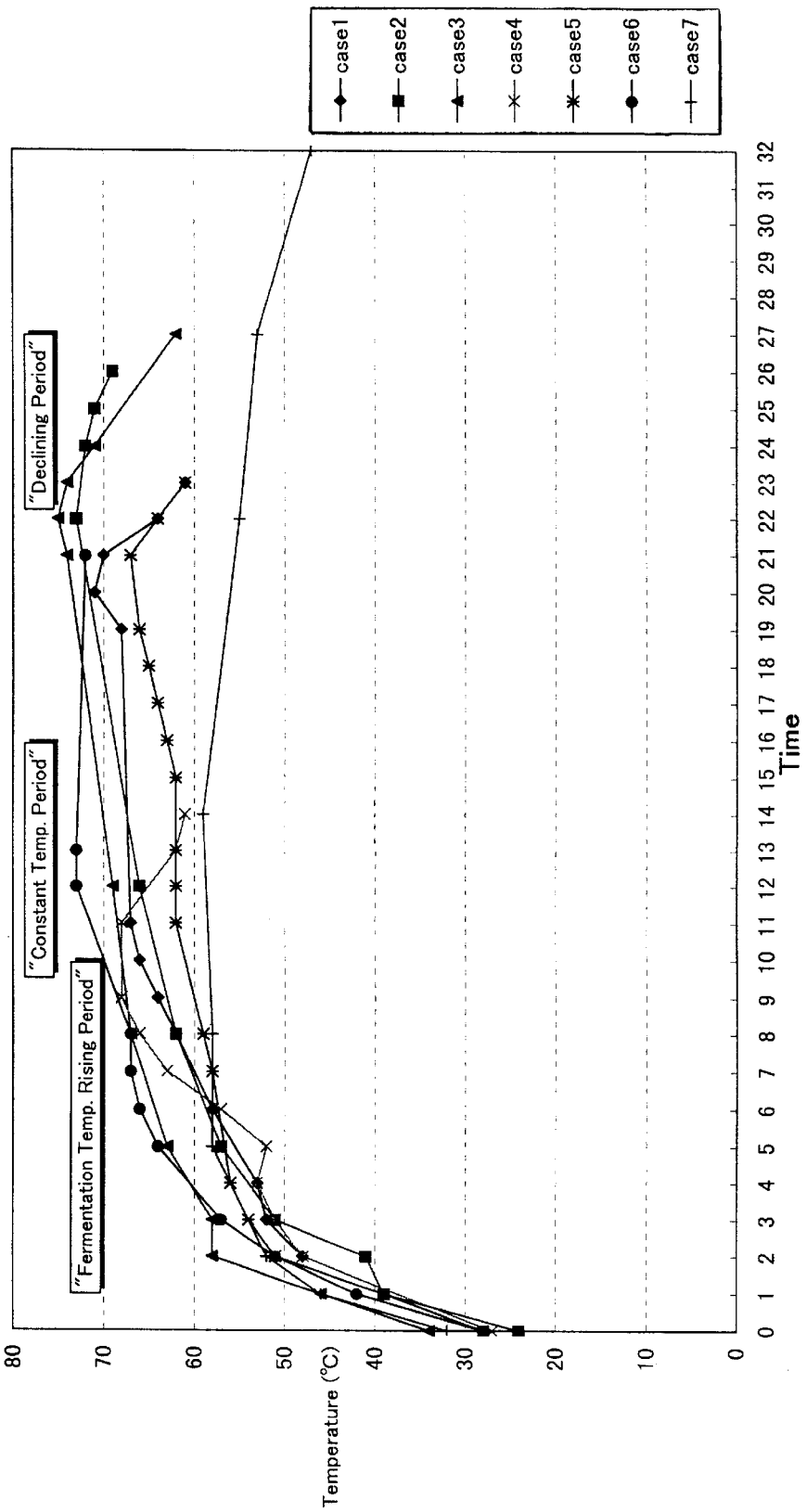
FIG. 5 is a graph showing change of temperature in fermenting tank as time passed.

With using a single fermenting tank 10, the raw food waste was dumped or supplied once, then stirred and crushed with the fermentation promoting agent, and fermented. Change of temperature inside the tank 10 (fermentation temperature) as time passed in this reference experiment is shown in Table 1 and FIG. 5. As in FIG. 5, it is known by those skilled in the art of microorganism fermentation that they refer a period when temperature inside the tank rises as "fermentation temperature rising period", a period thereafter when temperature is stable as "constant temperature period", and a period when fermentation ends and temperature drops as "declining period".

TABLE 1

Change of temperature in fermenting tank as time passed ("fermentation temperature rising period", "constant temperature period" and "declining period")

| No. TIME | I TEMP. | II TEMP. | III TEMP. | IV TEMP. | V TEMP. | VI TEMP. | VII TEMP. |
|---|---|---|---|---|---|---|---|
| 0 |    | 24 | 34 | 27 | 28 | 28 | 32 |
| 1 |    | 39 | 46 |    | 39 | 42 | 46 |
| 2 | 48 | 41 | 58 | 48 | 51 | 51 | 52 |
| 3 | 52 | 51 | 58 | 51 | 54 | 57 |    |
| 4 | 53 |    |    | 53 | 56 |    |    |
| 5 |    | 57 | 63 | 52 |    | 64 | 58 |
| 6 | 58 |    |    | 57 |    | 66 |    |
| 7 |    |    |    | 63 | 58 | 67 |    |
| 8 | 62 | 62 | 67 | 66 | 59 | 67 | 58 |
| 9 | 64 |    |    | 68 |    |    |    |
| 10 | 66 |    |    |    |    |    |    |
| 11 | 67 |    |    | 68 | 62 |    |    |
| 12 |    | 66 | 69 |    | 62 | 73 |    |
| 13 |    |    |    | 62 | 62 | 73 |    |
| 14 |    |    |    | 61 |    |    | 59 |
| 15 |    |    |    |    | 62 |    |    |
| 16 |    |    |    |    | 63 |    |    |
| 17 |    |    |    |    | 64 |    |    |

TABLE 1-continued

Change of temperature in fermenting tank as time passed
("fermentation temperature rising period",
"constant temperature period" and "declining period")

| No. TIME | I TEMP. | II TEMP. | III TEMP. | IV TEMP. | V TEMP. | VI TEMP. | VII TEMP. |
|---|---|---|---|---|---|---|---|
| 18 |  |  |  |  | 65 |  |  |
| 19 | 68 |  |  |  | 66 |  |  |
| 20 | 71 |  |  |  |  |  |  |
| 21 | 70 |  |  | 74 | 67 | 72 |  |
| 22 | 64 | 73 |  | 75 | 64 |  | 55 |
| 23 | 61 |  |  | 74 | 61 |  |  |
| 24 |  | 72 |  | 71 |  |  |  |
| 25 |  | 71 |  |  |  |  |  |
| 26 |  | 69 |  |  |  |  |  |
| 27 |  |  |  | 62 |  |  | 53 |
| 28 |  |  |  |  |  |  |  |
| 29 |  |  |  |  |  |  |  |
| 30 |  |  |  |  |  |  |  |
| 31 |  |  |  |  |  |  |  |
| 32 |  |  |  |  |  |  | 47 |

Figure 6:
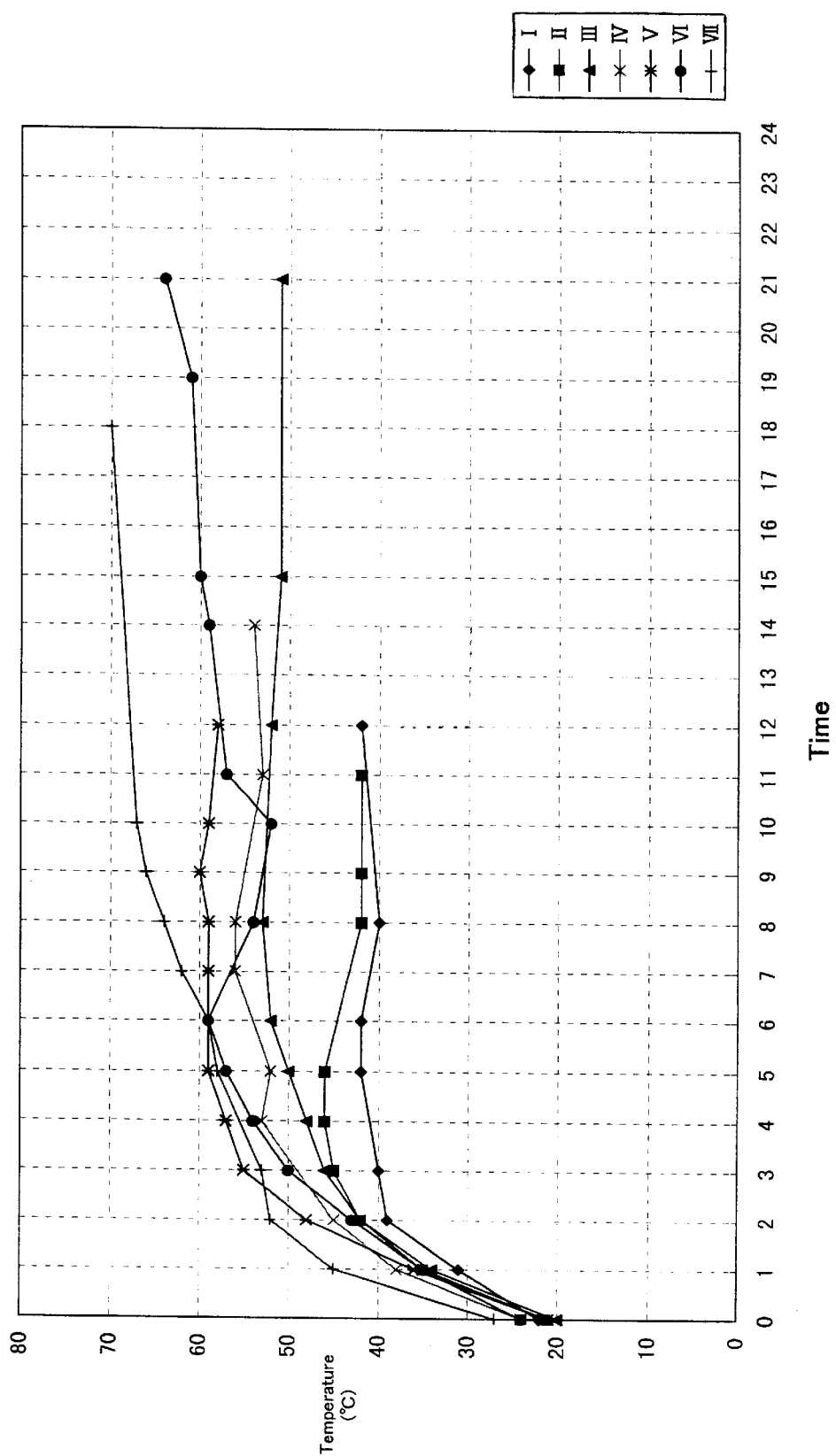
FIG. 6 is a graph showing change of temperature in fermenting tank as time passed.

According to another experiment under the same condition, temperature of "constant temperature period" extended in wide range from 40. C. to 70. C. depending on its fermentation condition as shown in Table 2 and FIG. 6. The reason why the prior raw food waste processing apparatus has unstable compost quality and sometimes has possibility to perish is that the temperatures of "constant temperature period" are not always the same and fermenting microorganism does not work well. In the prior raw food waste processing apparatus it takes an assumption that the organic material such as the raw food waste supplied to the fermenting tank 10 is automatically decomposed and composted. Further, the prior art apparatus has a shortcoming that an operator cannot estimate temperature of "constant temperature period" at start of the fermentation.

TABLE 2

Change of temperature in fermenting tank as time passed

| TIME/NO. | I | II | III | IV | V | VI | VII |
|---|---|---|---|---|---|---|---|
| 0 | 22 | 24 | 20 | 24 | 21 | 21 | 27 |
| 1 | 31 | 35 | 34 | 38 | 36 | 35 | 45 |
| 2 | 39 | 42 | 42 | 45 | 48 | 43 | 52 |
| 3 | 40 | 45 | 46 |  | 55 | 50 | 53 |
| 4 |  | 46 | 48 | 53 | 57 | 54 |  |
| 5 | 42 | 46 | 50 | 52 | 59 | 57 | 58 |
| 6 | 42 |  | 52 |  |  | 59 | 59 |
| 7 |  |  |  | 56 | 59 |  | 62 |
| 8 | 40 | 42 | 53 | 56 | 59 | 54 | 64 |
| 9 |  | 42 |  |  | 60 |  | 66 |
| 10 |  |  |  |  | 59 | 52 | 67 |
| 11 |  | 42 |  | 53 |  | 57 |  |
| 12 | 42 |  | 52 |  | 58 |  |  |
| 13 |  |  |  |  |  |  |  |
| 14 |  |  |  | 54 |  | 59 |  |
| 15 |  |  | 51 |  |  | 60 |  |
| 16 |  |  |  |  |  |  |  |
| 17 |  |  |  |  |  |  |  |
| 18 |  |  |  |  |  |  | 70 |
| 19 |  |  |  |  |  | 61 |  |
| 20 |  |  |  |  |  |  |  |
| 21 |  |  | 51 |  |  | 64 |  |
| 22 |  |  |  |  |  |  |  |
| 23 |  |  |  |  |  |  |  |
| 24 |  |  |  |  |  |  |  |

Figure 7:
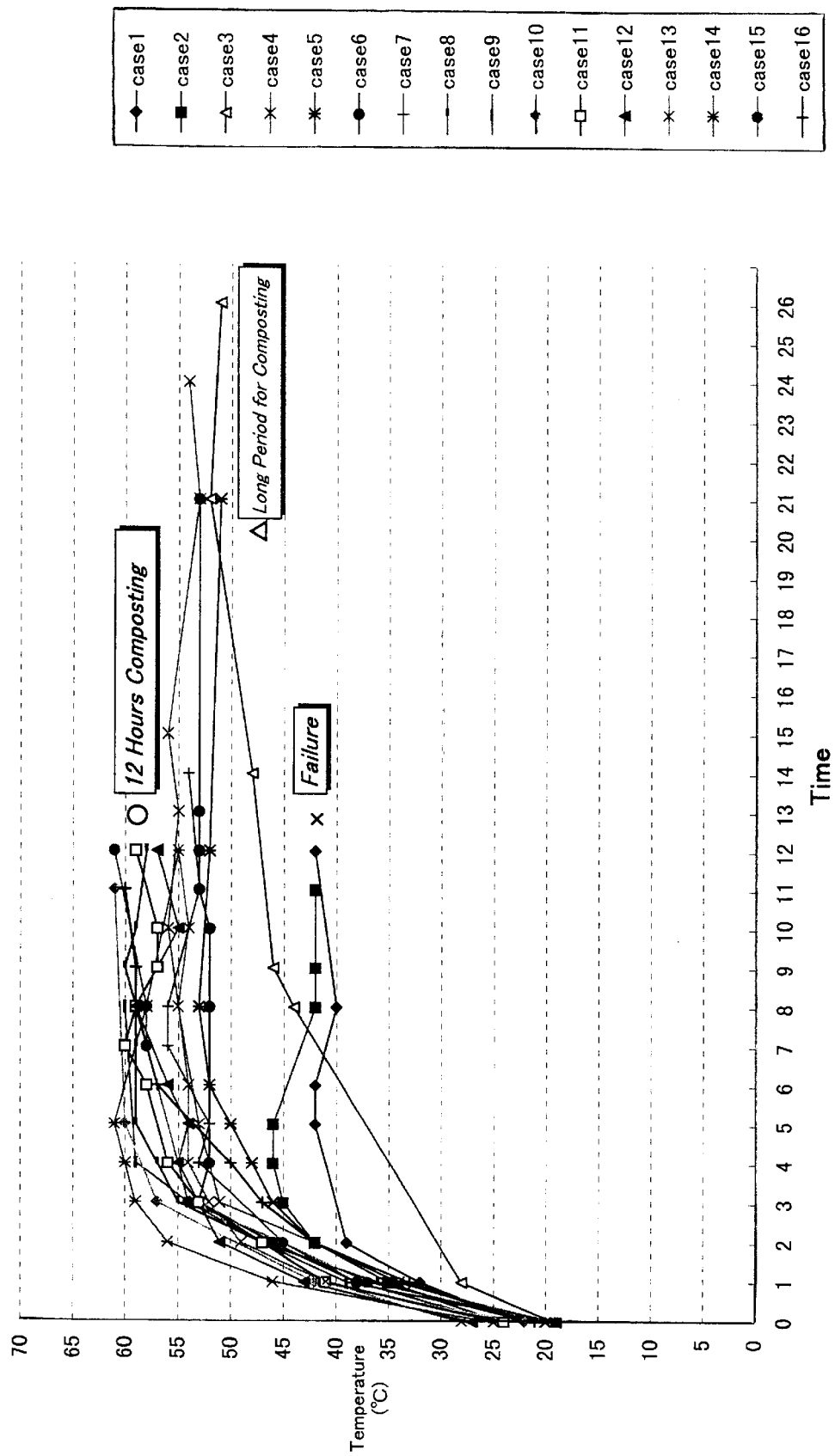
FIG. 7 is a graph showing change of temperature and time needed for composting.

According to still another experiment under the same condition, as shown in Table 3 and FIG. 7, if fermentation temperature was equal to or more than 55. C., the organic material was composted in about 12 hours. But if fermentation temperature was between 45. C. and 54. C., a long period of time was needed to compost the organic material.

Besides, at temperature equal to or under 44. C., fermentation did not progress and composting ended in failure. In case of the low fermentation temperature, the prior raw food waste processing apparatus could not obtain increased temperature in the middle of the process, so the organic material was left as it was. Alternatively, the present process was repeated so that the organic material was stirred and crushed again with the fermentation promoting agent.

TABLE 3

Change of temperature in fermenting tank and time needed for composting

| No. | 1 | 2 | 3 | 4 | 5 | 6 | 7 | 8 |
|---|---|---|---|---|---|---|---|---|
| Amount Discharged |  |  | 13 | 21 | 20 | 19 | 21 | 25 |
| Completion Hours | Failure | Failure | 27 | 24 | 21 | 21 | 14 | 12 |
| Time/Amount Supplied | 283 | 208 | 341 | 609 | 485 | 347 | 507 | 478 |

TABLE 3-continued

Change of temperature in fermenting tank and time needed for composting

| | 1 | 2 | 3 | 4 | 5 | 6 | 7 | 8 |
|---|---|---|---|---|---|---|---|---|
| 0 | 22 | 24 | 19 | 20 | 24 | 24 | 24 | 21 |
| 1 | 32 | 35 | 28 | 34 | 34 | 38 | 38 | 36 |
| 2 | 39 | 42 | | 42 | 42 | 46 | 45 | 47 |
| 3 | | 45 | | 51 | 46 | 53 | | 55 |
| 4 | | 46 | | | 48 | 52 | 53 | 57 |
| 5 | 42 | 46 | | 53 | 50 | | 52 | 59 |
| 6 | 42 | | | | 52 | | | |
| 7 | | | | | | | 56 | 59 |
| 8 | 40 | 42 | 44 | 55 | 53 | 52 | 56 | 59 |
| 9 | | 42 | 46 | | | | | 60 |
| 10 | | | | 56 | | 52 | | 59 |
| 11 | | 42 | | | | 53 | 53 | |
| 12 | 42 | | | | 52 | 53 | | 58 |
| 13 | | | | 55 | | 53 | | |
| 14 | | | 48 | | | | 54 | |
| 15 | | | | 56 | | | | |
| 16 | | | | | | | | |
| 17 | | | | | | | | |
| 18 | | | | | | | | |
| 19 | | | | | | | | |
| 20 | | | | | | | | |
| 21 | | | 52 | 53 | 51 | 53 | | |
| 22 | | | | | | | | |
| 23 | | | | | | | | |
| 24 | | | | 54 | | | | |
| 25 | | | | | | | | |
| 26 | | 51 | | | | | | |
| Date | Apr. 7, 1997 | Apr. 15, 1997 | Mar. 24, 1997 | Mar. 31, 1997 | Apr. 9, 1997 | Apr. 14, 1997 | Apr. 12, 1997 | Apr. 5, 1997 |

| No. | 9 | 10 | 11 | 12 | 13 | 14 | 15 | 16 |
|---|---|---|---|---|---|---|---|---|
| Amount Discharged | 21 | 24 | 25 | | | 19 | 18 | 22 |
| Completion Hours | 12 | 12 | 12 | 12 | 12 | 12 | 12 | 11 |
| Time/Amount Supplied | 429 | 413 | 443 | 504 | 459 | 478 | 498 | 415 |
| 0 | 19 | 22 | 24 | 27 | 28 | 25 | 19 | 21 |
| 1 | 39 | 42 | 41 | 43 | 41 | 46 | 37 | 33 |
| 2 | 47 | | 47 | 51 | 49 | 56 | 45 | 42 |
| 3 | 54 | 57 | 53 | | 52 | 59 | 54 | 47 |
| 4 | 59 | | 56 | 55 | 54 | 60 | | 50 |
| 5 | | 60 | | 54 | | 61 | | |
| 6 | | | 58 | 56 | 54 | | | 57 |
| 7 | | | 60 | | | | 58 | |
| 8 | 60 | | 59 | 59 | 55 | 58 | 58 | 59 |
| 9 | | | 57 | | | | | 59 |
| 10 | | | 57 | 55 | 54 | | | |
| 11 | | 61 | | | | | | 60 |
| 12 | | | 59 | 57 | 55 | 55 | 61 | |
| 13 | | | | | | | | |
| 14 | | | | | | | | |
| 15 | | | | | | | | |
| 16 | | | | | | | | |
| 17 | | | | | | | | |
| 18 | | | | | | | | |
| 19 | | | | | | | | |
| 20 | | | | | | | | |
| 21 | | | | | | | | |
| 22 | | | | | | | | |
| 23 | | | | | | | | |
| 24 | | | | | | | | |
| 25 | | | | | | | | |
| 26 | | | | | | | | |
| Date | Apr. 7, 1997 | Apr. 15, 1997 | Mar. 24, 1997 | Mar. 31, 1997 | Apr. 9, 1997 | Apr. 14, 1997 | Apr. 12, 1997 | Apr. 5, 1997 |

Figure 8:
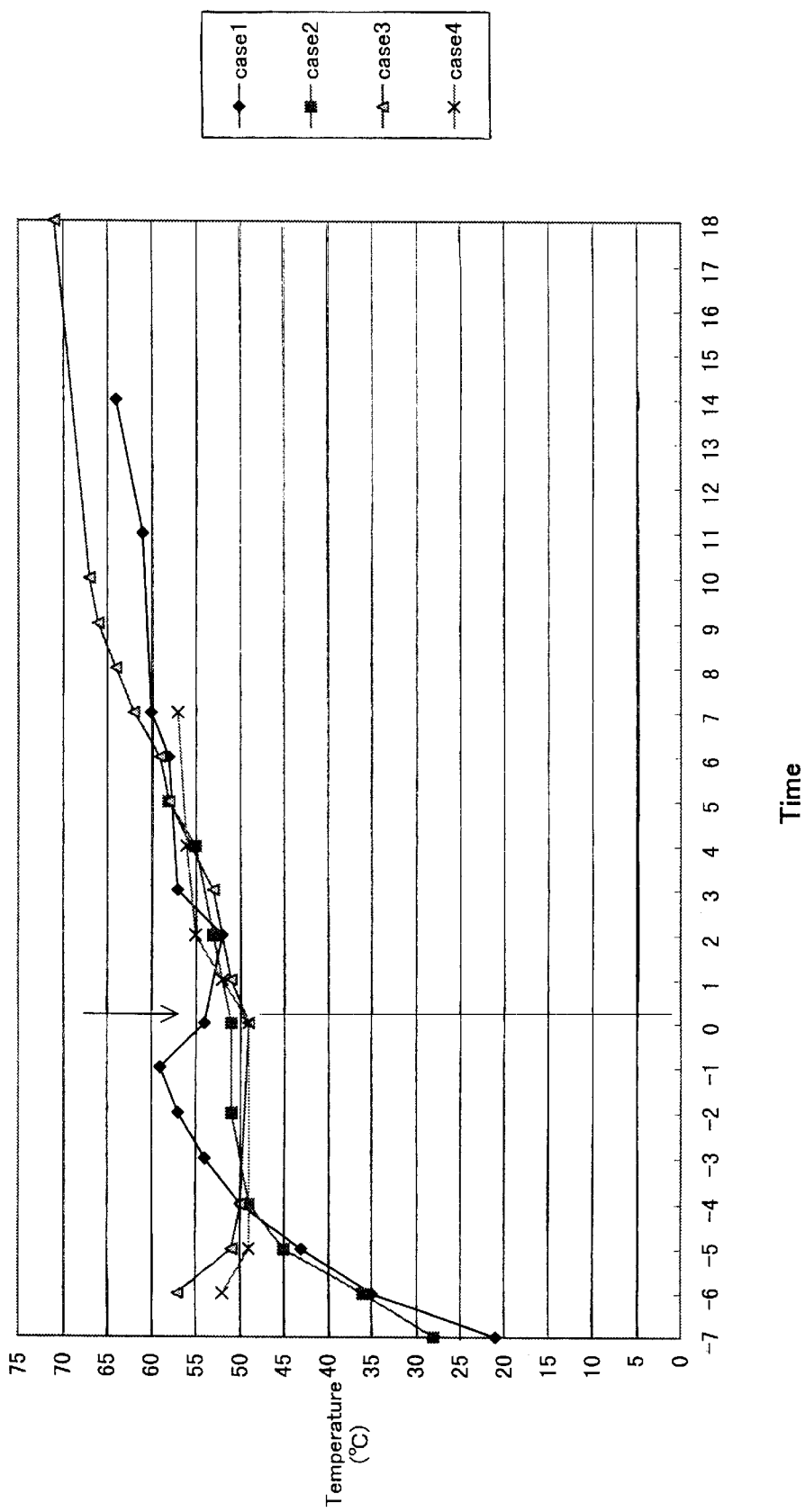
FIG. 8 is a graph showing activation of fermenting microorganism in fermenting tank.

In case that fermentation temperature was equal to or less than 55. C., the same amount of the fermentation promoting agent was supplied or dumped into the fermentation tank 10 and stirred. In this case, as shown in Table 4 and FIG. 8, temperature in the fermenting tank 10 rose to 55. C. or more after the first half of "fermentation temperature rising period". Besides, FIG. 8 showed change of temperature in the fermenting tank 10 when the same amount of the fermenting microorganism as that of the initial supply is added at time zero (o).

The feature of the present invention resides in the point that temperature in the fermenting tank is kept equal to or more than 55. C. That is to say, it maintains at temperature, which is possible to use activation of the fermenting microorganism efficiently, by detecting temperature in each of the fermenting tanks 10 and controlling or adjusting amount of the proceeding material supplied into each of the fermenting tanks 10.

TABLE 4

Activation of fermenting microorganism in fermenting tank
(Temperature in the fermenting tank rose to 55° C. or more after the first half of "fermentation temperature rising period (under 55° C.)", when the same amount of the fermenting microorganism as that of the initial supply was added at time zero (0))

| TIME | 1 TEMP. | 2 TEMP. | 3 TEMP. | 4 TEMP. |
|---|---|---|---|---|
|  | 21 | 28 |  |  |
| 1 | 35 | 36 | 57 | 52 |
| 2 | 43 | 45 | 51 | 49 |
| 3 | 50 | 49 | 50 | 49 |
| 4 | 54 |  | 49 | 52 |
| 5 | 57 | 51 | 51 | 55 |
| 6 | 59 |  |  |  |
| 7 |  | 51 | 53 | 56 |
| 8 | 54 |  |  |  |
| 9 |  | 53 | 58 |  |
| 10 | 52 |  | 59 | 57 |
| 11 | 57 | 55 | 62 |  |
| 12 |  | 58 | 64 |  |
| 13 |  |  | 66 |  |
| 14 | 58 |  | 67 |  |
| 15 | 60 |  |  |  |
| 16 |  |  |  |  |
| 17 |  |  |  |  |
| 18 |  |  |  |  |
| 19 | 61 |  |  |  |
| 20 |  |  |  |  |
| 21 |  |  |  |  |
| 22 | 64 |  | 71 |  |
| 23 |  |  |  |  |
| 24 |  |  |  |  |
| DATE | Apr. 16, 1997 | Apr. 19, 1997 | Apr. 21, 1997 | Apr. 21, 1997 |

Figure 9:
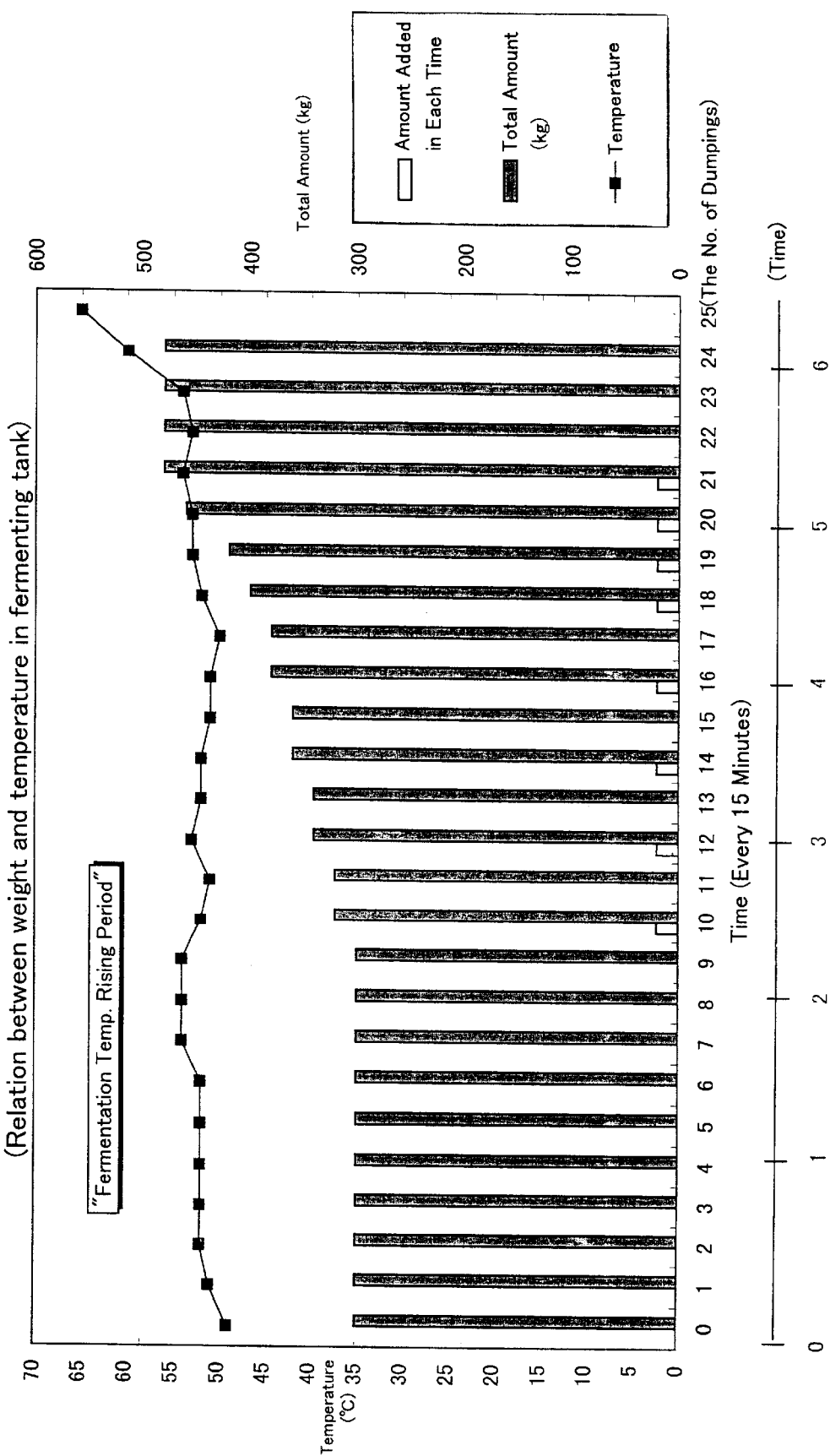
FIG. 9 is a graph showing relation between weight and temperature in fermenting tank.
Figure 10:
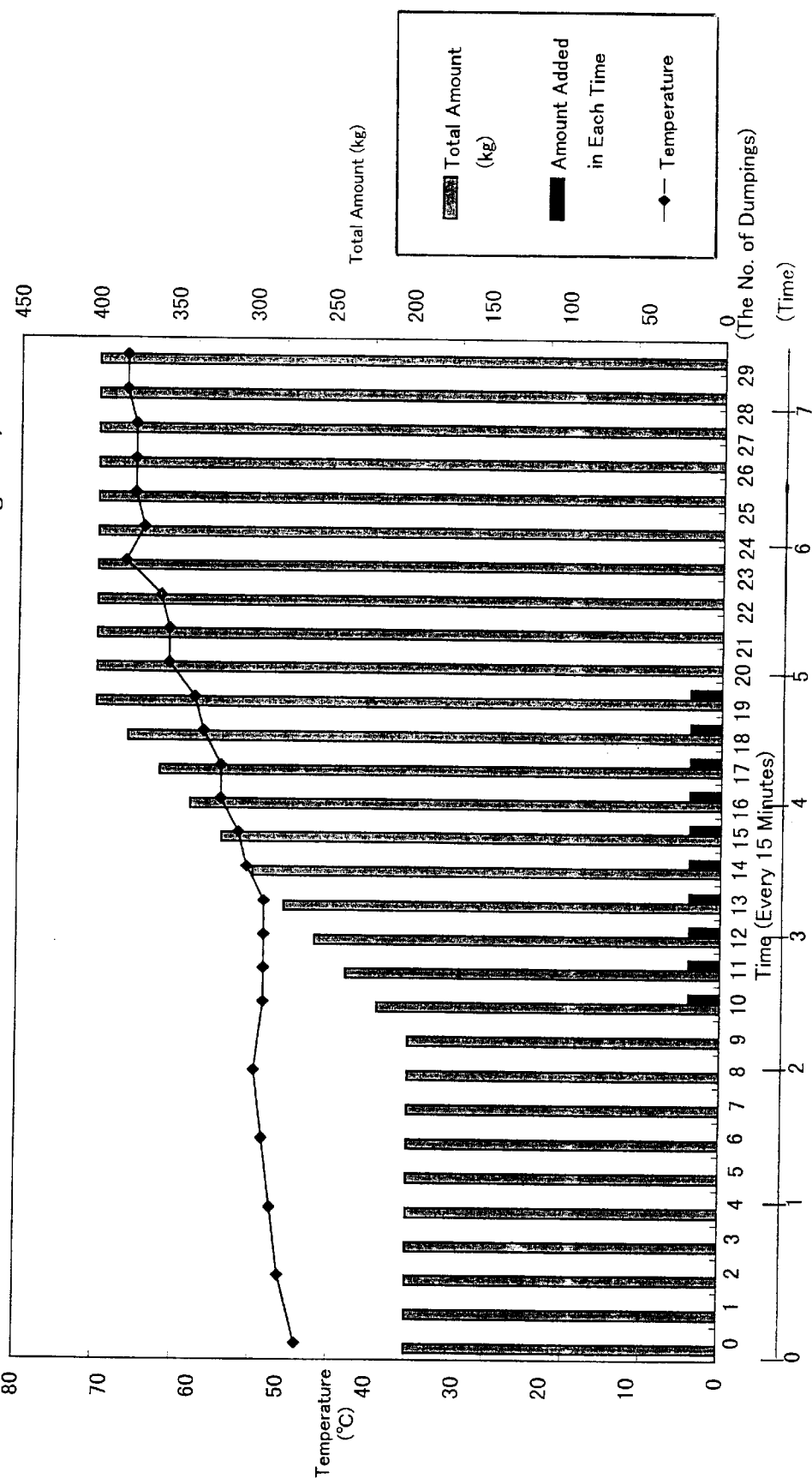
FIG. 10 is a graph showing relation between weight and temperature in fermenting tank.
Figure 11:
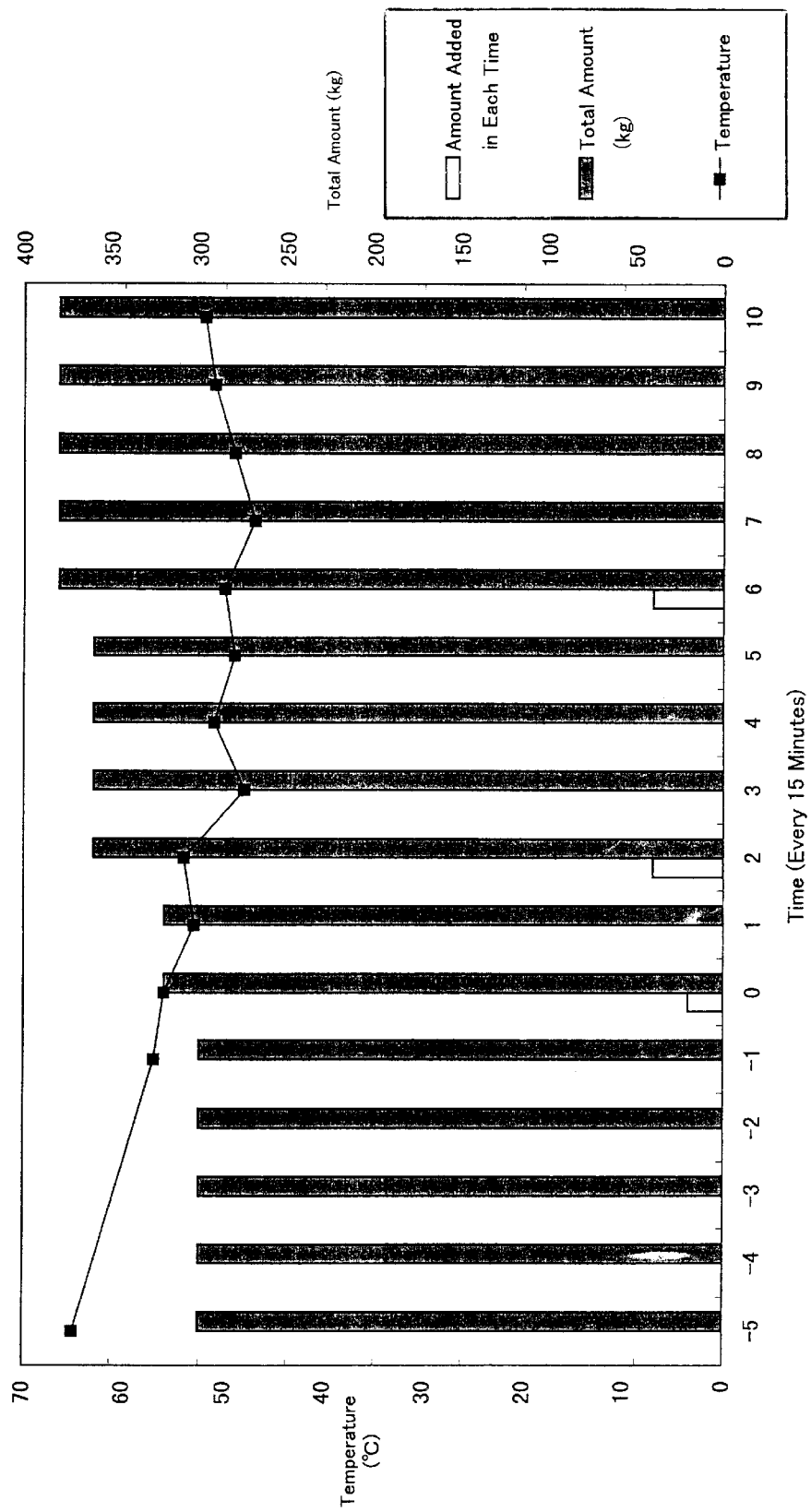
FIG. 11 is a graph showing change of temperature when raw food waste is added in temperature declining period in fermenting tank.

Under an estimate of activation of the fermenting microorganism in the fermenting tank 10 by temperature, it is necessary to detect suitable activation temperature by supplying a certain amount of the organic material such as raw food waste and observe change of temperature in the tank. As shown in Tables 5, 6 and FIGS. 9, 10, when a certain amount of the organic material as shown in the tables was added after two hours passed, the temperature in the fermenting tank 10 rose and activation of the fermenting microorganism was maintained. At the time when two hours passed after the organic material was supplied into the fermenting tank 10 for the first time, the temperature in the tank reached at temperature of "final phase of fermentation temperature rising period" or "constant temperature period". On the other hand, when the raw food waste was added to the fermenting tank 10, fermentation of which progressed to reach "declining period", its activation further reduced as shown in Table 7 and FIG. 11. From these facts, it is obvious that fermentation process by fermenting microorganism is suitable and efficient when it shall proceeded in "final phase of fermentation temperature rising period" or "constant temperature period".

TABLE 5

Change of temperature when raw food waste is added in "Fermentation temperature rising period" in fermenting tank
(Relation between amount and temperature in fermenting tank)

| Time (Every 15 Minutes) | Temp. | Amount Supplied | Total of the supplied | Total Amount (kg) |
|---|---|---|---|---|
| 0 | 49 | 0 | 0 | 300 |
| 1 | 51 | 0 | 0 | 300 |
| 2 | 52 | 0 | 0 | 300 |
| 3 | 52 | 0 | 0 | 300 |
| 4 | 52 | 0 | 0 | 300 |
| 5 | 52 | 0 | 0 | 300 |
| 6 | 52 | 0 | 0 | 300 |
| 7 | 54 | 0 | 0 | 300 |
| 8 | 54 | 0 | 0 | 300 |
| 9 | 54 | 0 | 0 | 300 |
| 10 | 52 | 20 | 20 | 320 |
| 11 | 51 | 0 | 20 | 320 |
| 12 | 53 | 20 | 40 | 340 |
| 13 | 52 | 0 | 40 | 340 |
| 14 | 52 | 20 | 60 | 360 |
| 15 | 51 | 0 | 60 | 360 |
| 16 | 51 | 20 | 80 | 380 |
| 17 | 50 | 0 | 80 | 380 |
| 18 | 52 | 20 | 100 | 400 |
| 19 | 53 | 20 | 120 | 420 |
| 20 | 53 | 20 | 140 | 460 |
| 21 | 54 | 20 | 160 | 480 |
| 22 | 53 | 0 | 160 | 480 |
| 23 | 54 | 0 | 160 | 480 |
| 24 | 60 | 0 | 160 | 480 |
| 25 | 65 | 0 | 160 | 480 |

TABLE 6

Raw food waste added in "fermentation temperature rising period" in fermenting tank
(Relation between weight and temperature in fermenting tank)

| Time (Every 15 Minutes) | Temp. | Amount Supplied | Total of the supplied | Total Amount (kg) |
|---|---|---|---|---|
| 0 | 48 | 0 | 0 | 200 |
| 1 |  | 0 | 0 | 200 |
| 2 | 50 | 0 | 0 | 200 |
| 3 |  | 0 | 0 | 200 |
| 4 | 51 | 0 | 0 | 200 |
| 5 |  | 0 | 0 | 200 |
| 6 | 52 | 0 | 0 | 200 |
| 7 |  | 0 | 0 | 200 |
| 8 | 53 | 0 | 0 | 200 |
| 9 |  | 0 | 0 | 200 |
| 10 | 52 | 20 | 20 | 220 |
| 11 | 52 | 20 | 40 | 240 |
| 12 | 52 | 20 | 60 | 260 |
| 13 | 52 | 20 | 80 | 280 |
| 14 | 54 | 20 | 100 | 300 |
| 15 | 55 | 20 | 120 | 320 |
| 16 | 57 | 20 | 140 | 340 |
| 17 | 57 | 20 | 160 | 360 |
| 18 | 59 | 20 | 180 | 380 |
| 19 | 60 | 20 | 200 | 400 |
| 20 | 63 | 0 | 200 | 400 |
| 21 | 63 | 0 | 200 | 400 |
| 22 | 64 | 0 | 200 | 400 |
| 23 | 68 | 0 | 200 | 400 |
| 24 | 66 | 0 | 200 | 400 |
| 25 | 67 | 0 | 200 | 400 |
| 26 | 67 | 0 | 200 | 400 |
| 27 | 67 | 0 | 200 | 400 |
| 28 | 68 | 0 | 200 | 400 |
| 29 | 68 | 0 | 200 | 400 |

TABLE 7

Change of temperature when raw food waste is added in "temperature declining period" in fermenting tank
(Relation between weight and temperature in fermenting tank)

| Time (Every 15 Minutes) | Temp. | Amount Supplied | Total of the supplied | Total Amount (kg) |
|---|---|---|---|---|
| −5 | 65 | 0 | 0 | 300 |
| −4 |    | 0 | 0 | 300 |
| −3 |    | 0 | 0 | 300 |
| −2 |    | 0 | 0 | 300 |
| −1 | 57 | 0 | 0 | 300 |
| 0  | 56 | 20 | 20 | 320 |
| 1  | 53 | 0  | 20 | 320 |
| 2  | 54 | 40 | 60 | 360 |
| 3  | 48 | 0  | 60 | 360 |
| 4  | 51 | 0  | 60 | 360 |
| 5  | 49 | 0  | 60 | 360 |
| 6  | 50 | 40 | 100 | 380 |
| 7  | 47 | 0  | 100 | 380 |
| 8  | 49 | 0  | 100 | 380 |
| 9  | 51 | 0  | 100 | 380 |
| 10 | 52 | 0  | 100 | 380 |

(Embodiment) Experiment on Three Connecting/Continuing Fermentation

In the continuous proceeding apparatus 1 of this present invention as shown on FIG. 1, independent process, in an independent system with the connecting vent 16 and the connecting slot 18 closed, was done by putting 120 kg of the processing material (made by stirring and crushing fermentation promoting agent in which microorganism is implanted in advance within organic material such as raw food waste) into the first, second, and third fermenting tank 10 respectively. When the temperature of all fermenting tanks 10 reach a certain temperature (for example, 60° C.), the connecting vent 16 and the connecting slot 18 were opened to make a connected system, and specific amount (for example, 34 kg every 30 minutes, every 20 minutes, or every 10 minutes) was put in from the supplying apparatus 20 to the first fermenting tank 10 by the supplying conveyer 24. Specific amount (for example, 34 kg or 17 kg every 30 minutes, 34 kg or 17 kg every 20 minutes, or 34 kg every 10 minutes) of the proceeding material fermented to a specific extent in the first fermenting tank 10 was conveyed from the first fermenting tank 10 to the second fermenting tank 10 by the screw conveyor 30 at regular time intervals. Moreover, specific amount (for example, 34 kg or 17 kg every 30 minutes, 17 kg every 20 minutes, or 34 kg every 10 minutes) of the proceeding material fermented to a specific extent in the second fermenting tank 10 was conveyed from the second fermenting tank 10 to the third fermenting tank 10 by the screw conveyer 30 at regular time intervals. Furthermore, specific amount (for example, 17 kg every 30 minutes, 17 kg every 20 minutes, or 34 kg or 17 kg every 10 minutes) of the processing material completely fermented and composted in the third fermenting tank 10 was discharged by the discharging apparatus 40 at regular time intervals. Table 8 and FIG. 12 show various data of the continuous processing apparatus 1 from the experiment on the three connecting/continuing fermentation. Since the temperature of the first fermenting tank 10 is somewhat unstable because the processing material (made by stirring and crushing fermentation promoting agent in which microorganism is implanted in advance within organic material such as raw food waste) is put in, the amount of the material conveyed is adjusted so that the temperature maintain 70° C. or more. The temperature inside the tank of the second and third fermenting tanks 10 gradually rise, and it always maintained more than 90° C. during the "constant temperature period".

The proceeding amount was 630 kg in 397 minutes, so it was possible to proceed 2285 kg per day.

TABLE 8

| | | | 1st Fermenting tank | | | 2nd Fermenting tank | | | 3rd Fermenting tank | | |
|---|---|---|---|---|---|---|---|---|---|---|---|
| Time (min) | Input (kg) | Overall (kg) | TEMP. | Input (kg) | Overall (kg) | TEMP. | Input (kg) | Overall (kg) | TEMP. | Dis- charge (kg) | Overall Dis- charge (kg) |
| 0 | 0 | 0 | 29.2 | 0 | 0 | 28.9 | 0 | 0 | 28.8 | 0 | 0 |
| 10 | 120 | 120 | 32.8 | 0 | 0 | 28.9 | 0 | 0 | 28.8 | 0 | 0 |
| 20 | 0 | 120 | 41.3 | 0 | 0 | 28.9 | 0 | 0 | 28.8 | 0 | 0 |
| 30 | 0 | 120 | 42.5 | 120 | 120 | 40.3 | 120 | 120 | 33.8 | 0 | 0 |
| 40 | 0 | 120 | 42.2 | 0 | 120 | 41.1 | 0 | 120 | 40.1 | 0 | 0 |
| 50 | 0 | 120 | 53.5 | 0 | 120 | 53.2 | 0 | 120 | 50.1 | 0 | 0 |
| 60 | 0 | 120 | 55.2 | 0 | 120 | 54.9 | 0 | 120 | 55.3 | 0 | 0 |
| 70 | 0 | 120 | 61.2 | 0 | 120 | 60.7 | 0 | 120 | 60.5 | 0 | 0 |
| 80 | 34 | 154 | 65.2 | 0 | 120 | 65.3 | 0 | 120 | 64.9 | 0 | 0 |
| 90 | 0 | 154 | 67.9 | 0 | 120 | 69.4 | 0 | 120 | 68.9 | 0 | 0 |
| 100 | 0 | 154 | 72.9 | 0 | 120 | 73.2 | 0 | 120 | 72.4 | 0 | 0 |
| 110 | 34 | 188 | 75.0 | 34 | 154 | 77.0 | 17 | 137 | 75.7 | 0 | 0 |
| 120 | 0 | 188 | 74.8 | 0 | 154 | 80.3 | 0 | 137 | 78.7 | 0 | 0 |
| 130 | 0 | 188 | 79.2 | 0 | 154 | 83.6 | 0 | 137 | 81.2 | 0 | 0 |
| 140 | 34 | 222 | 80.0 | 17 | 171 | 86.0 | 17 | 154 | 83.6 | 17 | 17 |
| 150 | 0 | 222 | 75.3 | 0 | 171 | 88.5 | 0 | 154 | 85.7 | 0 | 17 |
| 160 | 0 | 222 | 73.3 | 0 | 171 | 90.8 | 0 | 154 | 87.5 | 0 | 17 |
| 170 | 34 | 256 | 80.0 | 17 | 188 | 90.0 | 0 | 154 | 87.9 | 14 | 37 |
| 180 | 0 | 256 | 79.9 | 0 | 188 | 91.7 | 0 | 154 | 90.1 | 0 | 37 |
| 190 | 0 | 256 | 84.0 | 0 | 188 | 93.4 | 0 | 154 | 92.1 | 0 | 37 |
| 200 | 34 | 290 | 89.8 | 34 | 222 | 92.9 | 17 | 171 | 90.4 | 17 | 51 |
| 210 | 0 | 290 | 85.1 | 0 | 222 | 94.0 | 0 | 171 | 91.7 | 0 | 51 |
| 220 | 0 | 290 | 88.6 | 0 | 222 | 95.3 | 0 | 171 | 93.8 | 0 | 51 |
| 230 | 34 | 324 | 91.0 | 17 | 239 | 95.5 | 17 | 188 | 93.8 | 17 | 68 |
| 240 | 0 | 324 | 90.7 | 0 | 239 | 95.9 | 0 | 188 | 93.9 | 0 | 68 |

TABLE 8-continued

| Time (min) | 1st Fermenting tank | | | 2nd Fermenting tank | | | 3rd Fermenting tank | | |
|---|---|---|---|---|---|---|---|---|---|
| | Input (kg) | Overall (kg) | TEMP. | Input (kg) | Overall (kg) | TEMP. | Input (kg) | Overall (kg) | TEMP. | Dis-charge (kg) | Overall Dis-charge (kg) |

| Time (min) | Input (kg) | Overall (kg) | TEMP. | Input (kg) | Overall (kg) | TEMP. | Input (kg) | Overall (kg) | TEMP. | Dis-charge (kg) | Overall Dis-charge (kg) |
|---|---|---|---|---|---|---|---|---|---|---|---|
| 250 | 0 | 324 | 93.2 | 0 | 239 | 96.1 | 0 | 188 | 94.0 | 0 | 68 |
| 260 | 34 | 358 | 92.1 | 34 | 273 | 96.2 | 17 | 205 | 94.1 | 17 | 85 |
| 270 | 0 | 358 | 90.4 | 0 | 273 | 96.3 | 0 | 205 | 94.5 | 0 | 85 |
| 280 | 34 | 392 | 94.0 | 17 | 290 | 96.0 | 17 | 222 | 94.2 | 17 | 102 |
| 290 | 0 | 392 | 91.5 | 0 | 290 | 95.6 | 0 | 222 | 94.0 | 0 | 102 |
| 300 | 34 | 426 | 92.6 | 34 | 324 | 96.0 | 17 | 239 | 94.1 | 17 | 119 |
| 310 | 0 | 426 | 90.4 | 0 | 324 | 96.0 | 0 | 239 | 94.2 | 0 | 119 |
| 320 | 34 | 460 | 92.2 | 34 | 358 | 96.1 | 17 | 256 | 94.0 | 17 | 136 |
| 330 | 0 | 460 | 91.4 | 0 | 358 | 96.1 | 0 | 256 | 94.0 | 0 | 136 |
| 340 | 34 | 494 | 92.4 | 34 | 392 | 96.6 | 34 | 290 | 94.8 | 0 | 136 |
| 350 | 34 | 528 | 89.5 | 34 | 426 | 96.1 | 34 | 324 | 95.1 | 17 | 153 |
| 360 | 34 | 562 | 87.8 | 34 | 460 | 96.3 | 34 | 358 | 95.6 | 17 | 170 |
| 370 | 34 | 596 | 86.4 | 34 | 494 | 95.6 | 34 | 392 | 95.3 | 34 | 204 |
| 380 | 34 | 630 | 87.8 | 34 | 528 | 95.3 | 34 | 426 | 94.0 | 17 | 221 |
| 390 | 0 | 630 | 87.3 | 0 | 528 | 95.3 | 0 | 426 | 94.4 | 0 | 221 |
| 400 | 0 | 630 | 91.3 | 0 | 528 | 96.2 | 0 | 426 | 95.4 | 0 | 221 |
| 407 | 0 | 630 | 93.6 | 0 | 528 | 96.4 | 0 | 426 | 95.7 | 0 | 221 |

To compare with the method of the present invention, the raw food was proceeded in the following method with using only the prior raw food waste proceeding apparatus shown in FIG. 2.

Comparison 1

This an intermittent or batch processing method in which the raw food waste was supplied one time per day and the fermentation process had finished in some days. Total amount of the raw food waste proceeded was shown in the left column and amount of the raw food waste supplied everyday was shown in the right column of Table 10. Stirring method (time duration by number) and total amount of time were also shown in the columns of "stirring time" and "stirring method". "Number of days needed" means days needed to finish the fermentation process. For example, in the top experiment, 285 kg at first day, 93 kg at second day, and 76 kg at third (last) day were dumped in and stirred for 18 hours everyday. Therefore, total stirring time was 54 hours and three days were needed to finish the fermentation process. By dividing total processing amount 9369 kg by total number of 63 days, 148 kg per day (12 kg per hour) were obtained as an average of the processing amount.

TABLE 9

Addition and Batch Proceeding Method: Several Days

| Days Needed | Stirring Hours | Stirring Method | Amount Supplied in Each Day (kg) |
|---|---|---|---|
| 3 | 54 | 18 × 3 | 285, 93, 76 |
| 5 | 72 | 18 × 4 | 252, 132, 69, 186, 11 |
| 6 | 88 | 18 × 2 + 14 × 4 | 297, 118, 40, 105, 89, 30 |
| 5 | 60 | 14 × 5 | 337, 170, 54, 65, 33 |
| 5 | 62 | 14 × 3 + 20 | 240, 86, 168 |
| 5 | 52 | 14 × 3 + 10 | 393, 127, 80 |
| 5 | 59 | 14 + 10 × 3 + 15 | 321, 135, 20, 150, 56 |
| 4 | 34 | 10 × 3 + 4 | 283, 110, 145, 51 |
| 2 | 36 | 18 × 2 | 289 |
| 3 | 30 | 10 × 3 | 375, 60, 178 |
| 4 | 40 | 10 × 4 | 319, 148, 100, 60 |
| 4 | 40 | 10 × 4 | 283, 147, 250, 64 |

TABLE 9-continued

Addition and Batch Proceeding Method: Several Days

| Days Needed | Stirring Hours | Stirring Method | Amount Supplied in Each Day (kg) |
|---|---|---|---|
| 4 | 28 | 6 × 3 + 10 | 345, 146, 144, 60 |
| 5 | 50 | 10 × 3 + 15 + 5 | 383, 119, 134, 151, 25 |
| 4 | 36 | 8 × 2 + 10 × 2 | 417, 40, 125, 136 |

Average Amount of Proceeding

Amount/Day 146 kg
Amount/Hour 12 kg
Total Amount (kg) = 9369
Total Days = 63
Total Stirring Hours = 741

Comparison 2

This was a method in which all raw food waste was supplied or dumped at once and it took two days for the fermentation process. As shown in Table 11, by dividing total processing amount of 2674 kg by total number of 15 days, 178 kg per day (13 kg per hour) was obtained as an average of the processing amount.

TABLE 10

INITIAL SUPLLY AND 2 DAYS PROCESSING

| Total Amount (kg) | Days Needed | Stirring Hours | Stirring Method |
|---|---|---|---|
| 410 | 2 | 18 | 7 + 11 |
| 370 | 2 | 32 | 16 + 16 |
| 390 | 2 | 23 | 20 + 13 |
| 392 | 2 | 37 | 10 + 24 + 3 |
| 352 | 2 | 27 | 18 + 9 |
| 419 | 2 | 36 | 14 + 2 |
| 341 | 2 | 27 | 13 + 4 |

TABLE 10-continued

INITIAL SUPLLY AND 2 DAYS PROCESSING

| Total Amount (kg) | Days Needed | Stirring Hours | Stirring Method |
|---|---|---|---|
| Average Amount of Proceeding | | | |
| Amount/Day 178 kg | | | |
| Amount/Hour 13 kg | | | |
| Total Amount (kg) = 2674 | | | |
| Total Days = 15 | | | |
| Total Stirring Hours = 200 | | | |

Comparison 3

This was a method in which all raw food waste was supplied or dumped at once and it took one day for the fermentation process after continous stirring. As shown in Table 12, by dividing total proceeding amount of 6559 kg total number of 14 days, 468 kg per day (31 kg per hour) was obtained as an average of the proceeding amount.

TABLE 11

INITIAL SUPLLY AND CONTINUOUS STIRRING PROCESSING

| Total Amount (kg) | Days Needed | Stirring Hours |
|---|---|---|
| 498 | 1 | 12 |
| 609 | 1 | 24 |
| 478 | 1 | 12 |
| 478 | 1 | 12 |
| 485 | 1 | 21 |
| 429 | 1 | 12 |
| 413 | 1 | 12 |
| 507 | 1 | 14 |
| 415 | 1 | 11 |
| 347 | 1 | 21 |
| 494 | 1 | 21 |
| 443 | 1 | 12 |
| 504 | 1 | 12 |
| 459 | 1 | 12 |

Average Amount of Processing

Amount/Day    468 kg
Amount/Hour   31 kg
Total Amount (kg) = 6559
Total Days = 14
Total Stirring Hours = 208

Compared to the above comparisons, in the Embodiment according to the present invention, 2285 kg/3=762 kg (three fermenting tanks 10 were used, so divided by three to get the processing amount per tank) of the processing amount was obtained. Accordingly, the processing amount increased remarkably.

The present invention also has an advantage of stable composting of the organic material by high temperature period fermentation process because it can activate the fermentation microorganism in the fermenting tank. Moreover, it can get rid of non-operation time of the apparatus by 24 hour-continuous proceeding and, furthermore, if processes from temperature management to transfer of the processing material were computerized, it would become an automatic system and handling would be dramatically easy. As a worker's job, it is enough to just dump the organic matter such as raw food waste when it yields into the tank. And environmental hygiene gets better because flies etc. would not occur in all processes done in such closed space. Capacity of the fermenting tank is enough if it has half of the processing amount of the raw food waste, so a facility becomes small. Therefore, both facility cost and running cost may decrease remarkably. Further, even if any of the fermenting tanks 10 of the continuous proceeding apparatus I breaks down, it is possible to operate the apparatus using the remaining fermenting tank 10, so it has adaptability to emergency.

Accordingly, the Present invention provides a method for continuously proceeding organic material, which comprises the steps of:

jointly disposing at least two fermenting tanks in series with at least one stirring apparatus and at least one temperature detector;

supplying a certain amount of processing material into the first fermenting tank, said proceeding material being made by stirring and crushing the fermentation promoting agent in which microorganism is implanted in advance within an organic material such as raw food waste;

detecting temperature in each of the fermenting tanks and controlling amount of the half fermented material to be transferred from the fermenting tank positioned at upper stream to the fermenting tank positioned at lower stream such that the temperature in each of the fermenting tank maintains at temperature of "final phase of fermentation heat rising period" or "constant temperature period"; and discharging the composted organic material from the last fermenting tank properly when the processing material has been composted.

Therefore, fermentation progress of each of the fermenting tanks is able to proceed evenly. Further, amount of the half fermented material to be transferred from the fermenting tank positioned at upper stream to the fermenting tank positioned at lower stream is adjusted or controlled to maintain at temperature of "final phase of fermentation heat rising period" or "constant temperature period" in each of the fermenting tanks, so the organic material is composted in short time with using the fermenting microorganism activation efficiently. Accordingly, it becomes possible for the organic material to be continuously fermented.

What is claimed is:

1. A method for continuously processing organic material, which comprises the steps of:

jointly disposing at least three fermenting tanks in series with each having at least one stirring apparatus and at least one temperature detector;

supplying a predetermined amount of proceeding material into a first fermenting tank, said proceeding material being made by stirring and crushing fermentation promoting agent in which microorganism is implanted in advance an organic material such as raw food waste;

detecting temperature in each of the fermenting tanks, independently controlling amount of half fermented material to be transferred from the first fermenting to a second fermenting tank and amount of half fermented material to be transferred from the second fermenting to a third fermenting tank and so forth if the fourth or more fermenting tank exists such that the temperature in each of said fermenting tank maintains at temperature of "final phase of fermentation heat rising period" or "constant temperature period"; and discharging composted organic material from the last fermenting tank properly which the proceeding material has been composed.

2. A method for continuously processing organic material as stated in claim 1, said method further including fermentation preparing step prior to said step of supplying a predetermined amount of proceeding material into the first fermenting tank, said fermentation preparing step including, supplying a predetermined amount of said processing material into each of said fermenting tanks and fermenting it so that temperature in each of said fermenting tanks reaches at temperature of "final phase of fermentation heat rising period" or "constant temperature period".

3. A method for continuously organic material as stated in claim 1, wherein said step of supplying a predetermined amount of processing material comprises a step of randomly dumping the organic material which yields everyday as household raw waste into a high capacity tank in which the fermentation proceeding agent has been provided, stirring and crushing it, and said supplying step being conducted under the condition where the proceeding material is half fermented to reach at temperature of "final phase of fermentation heat rising period" or "constant temperature period".

4. A method for continuously processing organic material as stated in claim 3, wherein said high capacity tank includes a storage tank body in which the organic material yielding everyday is dumped and an organic material dumping apparatus which dumps an organic material into said storage tank body while it drains water, and inside of the storage tank body are provided a stirring pipe with which crushing holes are formed and a stirring screw located in said stirring pipe which sends up accumulated organic material on the bottom of the storage tank body and scatters some through said crushing holes of the stirring pipe and the other through the upper end of the stirring pipe into the storage tank body again.

5. An apparatus for continuously processing organic material, said apparatus comprises:

at least three fermenting tanks disposed in series to each other, each of said fermenting tank having at least one stirring apparatus and at least one temperature detector;

at least two transferring conveyers, the first transferring conveyor transfers the half fermented material from the first fermenting tank to the second fermenting tank and independently adjusts the amount of the processing material to be transferred there between, the second transferring conveyor transfers the half fermented material from the second fermenting tank to the third fermenting tank and independently adjusts the amount of the proceeding material to be transferred there between, and so forth if the third or more transferring conveyer exists;

a controller which detects temperature in each of the fermenting tank and independently adjusts the amount of the half fermented material to be transferred from the fermenting tank positioned at upper stream to the fermenting tank positioned at lower stream such that the temperature in each of said fermenting tank maintains at temperature of "final phase of fermentation heat rising period" or "constant temperature period", and a discharging apparatus which discharges composted organic material from the last fermenting tank properly which the processing material has been composed.

* * * * *